United States Patent Office 3,302,302
Patented Feb. 7, 1967

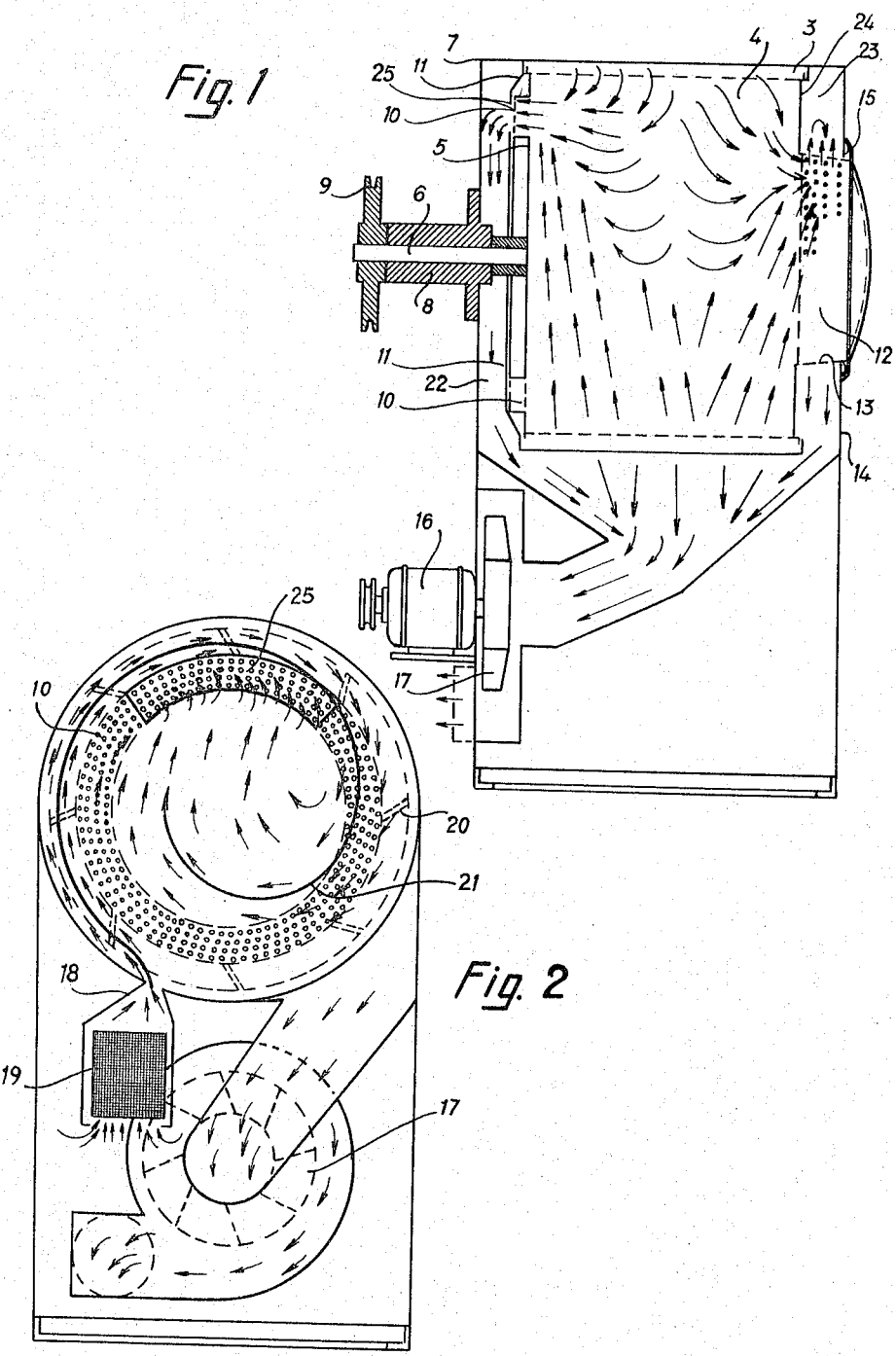

3,302,302
APPARATUS FOR DRYING CLOTHING AND
SIMILAR ARTICLES IN A DRUM
Antonio Ferrer Font, 79–81 Pablo Alcover St.,
Barcelona, Spain
Filed Jan. 24, 1964, Ser. No. 340,016
Claims priority, application Spain, Jan. 25, 1963,
284,538
2 Claims. (Cl. 34—133)

This invention relates to apparatus for drying clothes or other similar articles.

Installations for the drying of clothes or other similar articles are known which comprise a closed casing within which a horizontal loading drum for holding the clothes to be dried and having apertures for the circulation of hot air gyrates with the drum being provided with longitudinal ribs for actively moving the clothes. In these installations the current of hot air passes through the drum, by entering through an aperture in the upper part of a plate or sheet which surrounds the periphery of said drum, and leaves through another aperture situated in the lower part of the plate or sheet. In this case, the trajectory of the hot air is limited to a length equivalent to the diameter of the drying drum.

Other installations for the drying of clothes or similar articles also exist in which the current of hot air enters from below into the drying drum, leaving the same divided into two central streams through the front walls of the drying drum, with the streams subsequently reuniting to be discharged to the exterior of the installation. In other apparatus, the air is directed in opposing streams, and the central drum is held by supports such as rollers.

The object of the invention is to provide a new installation, by means of which with the same heater and the same rate of flow of air due to the strong whirlwind produced therein and by maintaining the clothes in a floating state there results at least a 25% reduction in drying time.

The present invention broadly comprehends the drying of clothes or similar articles by means of a drying drum contained within a casing through which drum and casing is directed a strong current of hot air forming a whirlwind, with the current being aspirated to enter tangentially throughout the whole width and surrounding the installation, and more particularly by entering the whole of the drum in the same direction that the drum gyrates. Once this current of air has passed through the clothes within the drum, it leaves by apertures provided in the upper part of the two front walls, so that due to the characteristics of the installation the hot air travels through the interior of the drum in a long spiral path.

The present invention, in addition to lengthening the trajectory of the hot air within the drum, effects a more rapid drying, since by aspirating the air through the upper lateral parts, the clothes are maintained in a floating state thereby remaining suspended within the drum, thus obtaining a more intimate clothes-air contact which accelerates the drying process while materially reducing the time necessary for this operation, and consequently the mechanical wearing out of the clothes.

With this invention the moisture is removed from the clothes in much less time than with known processes, in view of the fact that the hot air current travels over a trajectory twice as long as the usual ones. Due to this increase in drying efficiency, the costs and the drying time are reduced, with the clothes being protected by the reduction in the time during which they are subjected to abrasion action against the walls of the drum, and which abrasive action is held to a minimum since the clothes are maintained in a floating state in the air current.

Another advantage of this invention is that the drying is completely uniform since the air is in full contact with the whole of the clothes, while in other known installations, the contact of the air with the clothes is exclusively lateral.

This invention, owing to the strong whirlwind of air and the exit of the same at the lateral upper parts, reduces the drying time more than 25% with relation to the best known machines which use the same heating and same rate of air.

Further objects and advantages of the invention will become more readily apparent to persons skilled in the art from the following detailed description and annexed drawings, and in which drawings:

FIGURE 1 is a diagrammatic view showing in lateral vertical cross section the present machine, and FIGURE 2 is a diagrammatic view showing the front of the machine.

Generally, the present drying apparatus includes a casing, a horizontal drum mounted for gyratory movement within the casing, the drum having opposite end walls and a peripheral wall, one of the end walls having apertures therein, the other of the end walls having apertures in the upper portion thereof only, intermediate wall means located between the casing and one end wall portion provided with a segmental opening in the upper portion thereof, a source of suction within the casing, heating means within the casing communicating tangentially with the drum so that upon activation of the source of suction, hot air is drawn into the drum to flow in a spiral path therein for passing through the clothing in the drum and be directed horizontally in two streams against the opposite end walls of the drum and pass from the drum through the apertures in the one end wall and the segmental opening in the intermediate wall means and the apertures in the upper portion of the other wall means, and conduit means within the casing with which two air streams communicate leading to the source of suction.

Referring to the drawings, it will be seen that the installation comprises a casing 3 in which a drum 4 gyrates for drying the clothes. A shaft 6 is rigidly coupled to front wall 5 of the drum 4 and extends through a support 8 fixed to the casing.

A pulley 9 is firmly fixed to the free end of the shaft 6 and the front wall of the drum is provided with a crown of holes 10 while the remainder of the wall is solid or imperforate.

A fixed intermediate wall 11 is located behind the wall 5 of the drum 4, which by means of open sector 25 locates the suction of the back wall at the high point of the wall 5. The other front wall 24 of the drum 4 is provided with a large passage way 12 on its gyratory axis limited by entrance collar 13 through which the articles to be dried may be introduced into the drum. The entrance collar extends to front wall 14 of the casing 3 and wall 14 is provided with an aperture communicating with the collar 13. The aperture is adapted to be closed by means of a door 15 and the upper half of the collar 13 is provided with holes.

A fan 17 driven by a motor 16 is mounted in the casing below the drum 4 and the fan 17 is shown functioning as an aspirator.

It will be appreciated that the drum 4 is of slightly less outer diameter than the cylindrical aperture of the casing 3 and a support 18 is provided at the lower part thereof. A heater 19 is mounted in the front of the support and the support is formed with an opening directed tangentially towards the drum 4.

The apparatus operates as follows:

The articles to be dried, such as wet clothing, are introduced through the collar 13 into the drum after opening the door 15. The door 15 is then closed and upon operation of the fan 17, air is drawn through the support 18 heated by the heater element 19 and admitted into the drum.

The support 18 is vertically inclined and the air upon entering is directed between the drum 4 and the casing 3 so that its passage through the interior of the drum is in spiral form. The articles to be dried are thus caught during the gyratory movement of the drum 4 by longitudinal projections 20 and so are raised to fall later due to their own weight. The process continues throughout the length of the gyratory movement of the drum.

In this process, the current of hot air through the drum 4 follows a trajectory similar to that shown in FIGURE 2 and passes through the clothing.

During this spiral trajectory, the hot air is directed horizontally in two directions against the walls 5 and 24 of the drum 4. One flow passes through the passageway 12 for the wall 24 and the holes provided in the upper half of the entrance collar 13 into channel 23 located between wall 24 and wall 14 of the casing. The other flow passes through the apertures in the wall 5 located in front of the open sector 25 in the intermediate wall 11 into channel 22 defined between wall 7 of the casing and the intermediate wall. The respective air flows leave the channels 22 and 23 via a common outlet to the fan 17.

The invention is not to be confined to any strict conformity to the showings in the drawings but changes and modifications may be made therein so long as such changes and modifications mark no material departure from the spirit and scope of the appended claims.

What I claim is:

1. An apparatus for drying clothing and similar articles, comprising a casing, a horizontal drum mounted for gyratory movement within the casing, said drum having opposite end walls and a peripheral wall, one of said end walls having apertures therein, the other of said end walls having apertures in the upper portion thereof only, intermediate wall means located between said casing and one end wall provided with a segmental opening in the upper portion thereof, a source of suction within the casing, heating means within the casing communicating tangentially with the drum so that upon activation of the source of suction, hot air is drawn into the drum to flow in a spiral path therein for passing through the clothing in the drum and be directed horizontally in two streams against said opposite end walls of the drum and pass from the drum through the apertures in said one end wall and the segmental opening in the intermediate wall means and the apertures in the upper portion of the other wall means, and conduit means within the casing with which said two air streams communicate leading to said source of suction.

2. The drying apparatus as claimed in claim 1 in which said apertures in said one wall are arranged in a circular crown concentric with the gyratory axis of movement of the drum intermediate the outer periphery of the drum and the axis of movement thereof.

References Cited by the Examiner

UNITED STATES PATENTS

| 1,762,594 | 6/1930 | Seifert | 34—133 |
| 3,001,297 | 9/1961 | Plumer | 34—133 |

FOREIGN PATENTS 513,785   9/1952   Belgium.

DONLEY J. STOCKING, *Primary Examiner.*

JOHN J. CAMBY, *Examiner.*